(12) United States Patent
O'Connell et al.

(10) Patent No.: US 6,236,641 B1
(45) Date of Patent: May 22, 2001

(54) STORM PROTECTION MECHANISM

(75) Inventors: Anne O'Connell, Dublin; Tadhg Creedon, County Galway, both of (IE)

(73) Assignee: 3Com Technologies, Grand Caymen (KN)

( * ) Notice: Subject to any disclaimer, the term of this patent is extended or adjusted under 35 U.S.C. 154(b) by 0 days.

(21) Appl. No.: 08/981,142

(22) PCT Filed: May 30, 1996

(86) PCT No.: PCT/EP96/02337

§ 371 Date: Aug. 24, 1998

§ 102(e) Date: Aug. 24, 1998

(87) PCT Pub. No.: WO96/38956

PCT Pub. Date: Dec. 5, 1996

(30) Foreign Application Priority Data

May 31, 1995 (GB) .................................................. 9510934

(51) Int. Cl.⁷ ......................... H04L 12/18; H04L 12/26; H04L 12/46

(52) U.S. Cl. .......................... 370/230; 370/390; 370/401; 370/432; 709/235

(58) Field of Search ............................ 370/216, 217, 370/218, 229, 230, 232, 235, 236, 252, 253, 389, 390, 401, 428, 432; 709/230, 231, 232, 233, 234, 235, 238, 249

(56) References Cited

U.S. PATENT DOCUMENTS

| 4,188,583 | * | 2/1980 | McCurdy | 325/163 |
| 5,315,580 | * | 5/1994 | Phaal | 370/13 |
| 5,343,465 |   | 8/1994 | Khalil | 370/17 |
| 5,539,659 | * | 7/1996 | McKee et al. | 364/514 B |
| 5,604,867 | * | 2/1997 | Harwood | 395/200.13 |
| 5,636,345 | * | 6/1997 | Valdevit | 370/232 |
| 5,768,258 | * | 6/1998 | Van As et al. | 370/236 |
| 5,901,140 | * | 5/1999 | Van As et al. | 370/236 |

FOREIGN PATENT DOCUMENTS

| 0 477 448 A1 | 4/1992 | (EP) | H04L/12/26 |
| 4-81145 | 3/1992 | (JP) | H04L/12/40 |

* cited by examiner

*Primary Examiner*—Alpus H. Hsu
(74) *Attorney, Agent, or Firm*—McDonnell Boehnen Hulbert & Berghoff

(57) ABSTRACT

A system is provided that protects a network from storms of multicast/broadcast data. The system includes a switch or bridge which monitors traffic through it in order to detect the onset of a storm condition from previous receptions of requests for multicasts or broadcasts. Each port or bridge or switch has associated with it one data bit which can be controlled to prevent a storm of multicasts/broadcast data being forwarded to all parts of the switch and jamming the system.

1 Claim, 1 Drawing Sheet

STORM PROTECTION MECHANISM

CROSS-REFERENCE TO RELATED APPLICATION

This application claims priority to WO 96/38956, filed May 30, 1996, entitled "Storm Protection Mechanism", naming Anne O'Connell as an inventor.

FIELD OF THE INVENTION

The present invention relates to computer network devices and more particularly to bridges or such devices having bridge-like characteristics.

DESCRIPTION OF THE RELATED ART

It is customary in computer networks for every device to have a unique address associated with it. Usually networks are designed to allow a one-to-one communication between ports of the network to which the devices are attached, but it is often the case that one port wishes to broadcast the same message to all other ports within the network. While this is acceptable, one has to guard against the possibility of a so-called storm of such broadcast data occurring in view of the fact that this would normally jam buffer stores associated with each port and also with the fact that the whole network would be slowed down.

SUMMARY OF THE INVENTION

The present invention proposes that a switch or bridge monitors traffic through it, and utilizes certain parameters of the statistics related to the traffic through the bridge or switch in order to detect the onset of a storm condition and takes action to control the level of such traffic within limits.

Preferably, each port has associated with it one bit which can be controlled in order to prevent a storm of multicast/broadcast data being forwarded to all the ports of the switch and jamming the system.

The switch or bridge can simply identify from previous receptions of requests for multicasts or broadcasts that it will become overloaded and thus refuse to handle any further request for multicasts or broadcasts until a suitable time.

In order that the present invention be more readily understood, an embodiment thereof will now be described by way of example only with reference to the accompanying drawings in which:

DESCRIPTION

Figure 1:
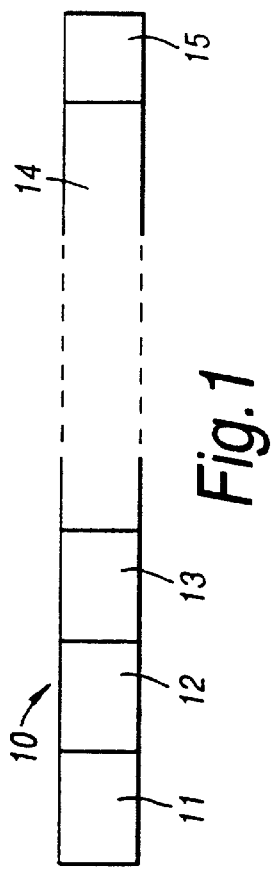
FIG. 1 shows the form of a typical packet of information.

As indicated in FIG. 1 a typical packet 10 of information on an ethernet network consists of a block of information 11 indicating the destination address of the packet of information, a source address 12 indicating the device from which the information is derived, other control information 13, actual data 14 to be transmitted, and finally a block 15 indicating any errors which have occurred.

Figure 2:
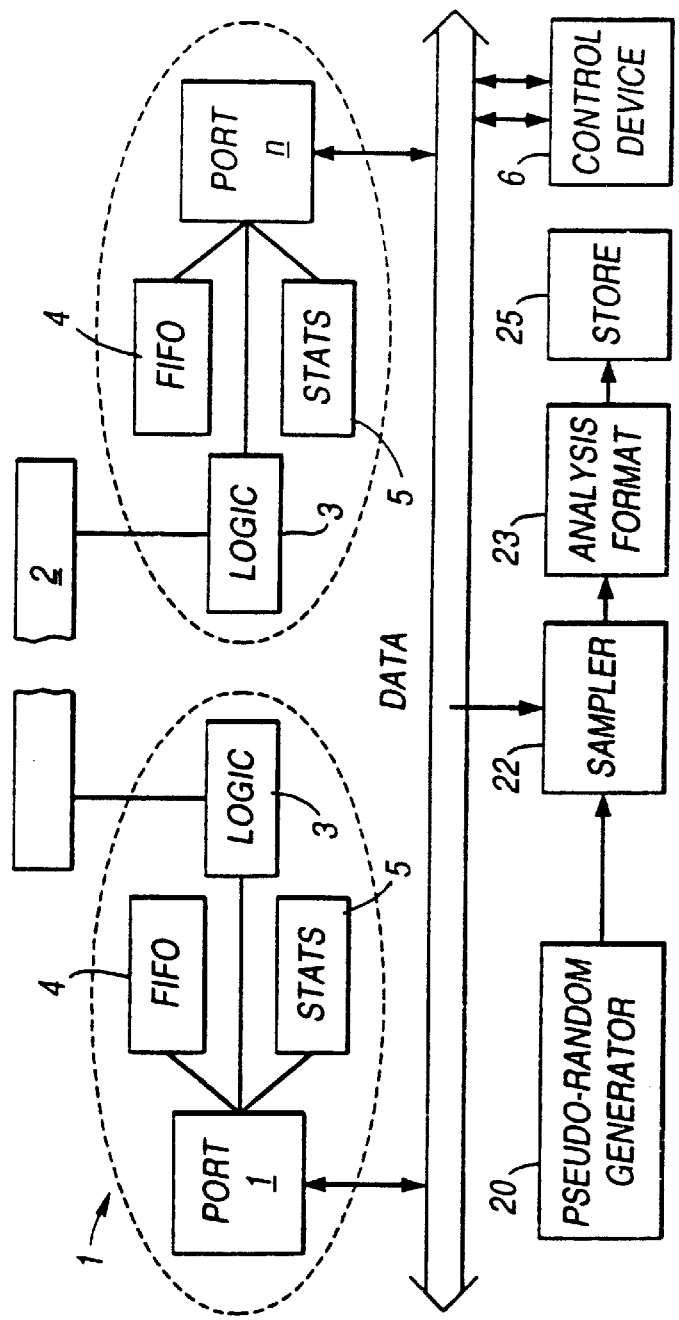
FIG. 2 shows diagrammatically a circuit layout of a switch or bridge for explaining the present invention.

Referring now to FIG. 2, a switch or bridge 1 is represented as comprising a number of ports 1 . . . n, only two of which are shown. Data flow through the ports is controlled by a management entity 2 and a control device 6, which allows data transfer between ports. Each port includes a number of circuits including a port logic circuit 3, a data memory 4 for data received by and transmitted by the port and a statistics memory section 5 which stores details of all packets generated by the device (not shown) connected to the port.

In addition to the above, it is also possible to sample data flowing through the bridge or switch. A pseudo random generator 20 is provided which generates a sampling pulse. This sampling pulse operates a gating circuit 22 which feeds information from the next complete packet of a stream of data on the data bus of the network after the timing pulse through an analysis and formatting circuit 23 into the additional memory 25 and then closes the gate at the end of that packet until such time as the next timing pulse is generated by the pseudo random timer.

Either the data from the memory section 5 or data derived from the sampled data can be used for a number of purposes such as the storm protection mechanism which will now be described.

Turning now to the present invention, it is assumed that the networks comprises one or more switches or bridges each having a number of ports as well as a management entity for each switch or bridge. Each of the ports of a switch is known to the management entity of the switch and each port has storage and logic circuits.

In our proposed switch the control device contains a bit associated with each port, which can be altered in response to instructions from the management entity of the switch. The memory section 5 includes stores for logging all traffic through the port including accurate statistics of all broadcast and/or multicast messages created by the device attached to the port.

The management entity monitors traffic through all ports of the switch or bridge and compiles statistics relating to the traffic. Included in the statistics are the number of occasions multicast/broadcast data is being supplied. On the basis of the statistics, from either the total or supplied data or both the management entity makes a decision as to whether to permit a further multicast/broadcast data message to pass through the switch or bridge. If the management entity determines that a storm would result from a further multicast/broadcast data message which would normally jam the memory related with each port and also slow down the network, the management entity then changes the bit associated with the port in the control device 10. The control device on seeing this bit set, will direct any subsequent multicast/broadcast message to a non-existent port of the switch. In our system this is port 31.

It is considered that this system of diversion to a non-existent port is superior to that of simply turning off a port which is attempting to transmit a multicast/broadcast message or of electing all broadcast or multicast traffic input through the port since the statistics relating to usage of the network are being maintained in an accurate form and consequently the management entity can detect when traffic on the network reduces to such a level that further multicast/broadcast message can be accommodated. At that point, the bit per port can be changed back to permit multicast/broadcast messages.

This particular method permits unicast messages to be handled by the network as usual whether or not the storm protection mechanism is in operation.

What is claimed is:

1. A switch device for protecting a computer network from multicast and/or broadcast storms, the switch device comprising:

- a plurality of ports for the transmission and reception of network data packets;
- an internal data bus coupled to said ports for conveying packets received by any of said ports to any others of said ports:
- a pseudo-random generator for producing sampling pulses;
- sampling means coupled to said internal bus and to said pseudo-random generator, for sampling, in response to each sampling pulse and a data sequence indicating the start of a network data packet, a single respective one of said network data packets appearing on said internal data bus;
- means for capturing a plurality of predetermined portions, wherein each predetermined portion is extracted by said sampling means from one of the single respective network data packets;
- a management entity within said switch device for analyzing said plurality of predetermined portions to be able to protect the computer network from storms, said management entity compiling statistics whether to prevent a further broadcast or multicast message to pass through the switch device; and
- a control device responsive to said decision to direct said further broadcast or multicast message to a non-existent port of the switch device.

* * * * *